Aug. 23, 1932.  H. E. McCRAY  1,873,447
STEERING MECHANISM FOR TRACTORS
Filed Sept. 28, 1929   2 Sheets-Sheet 1
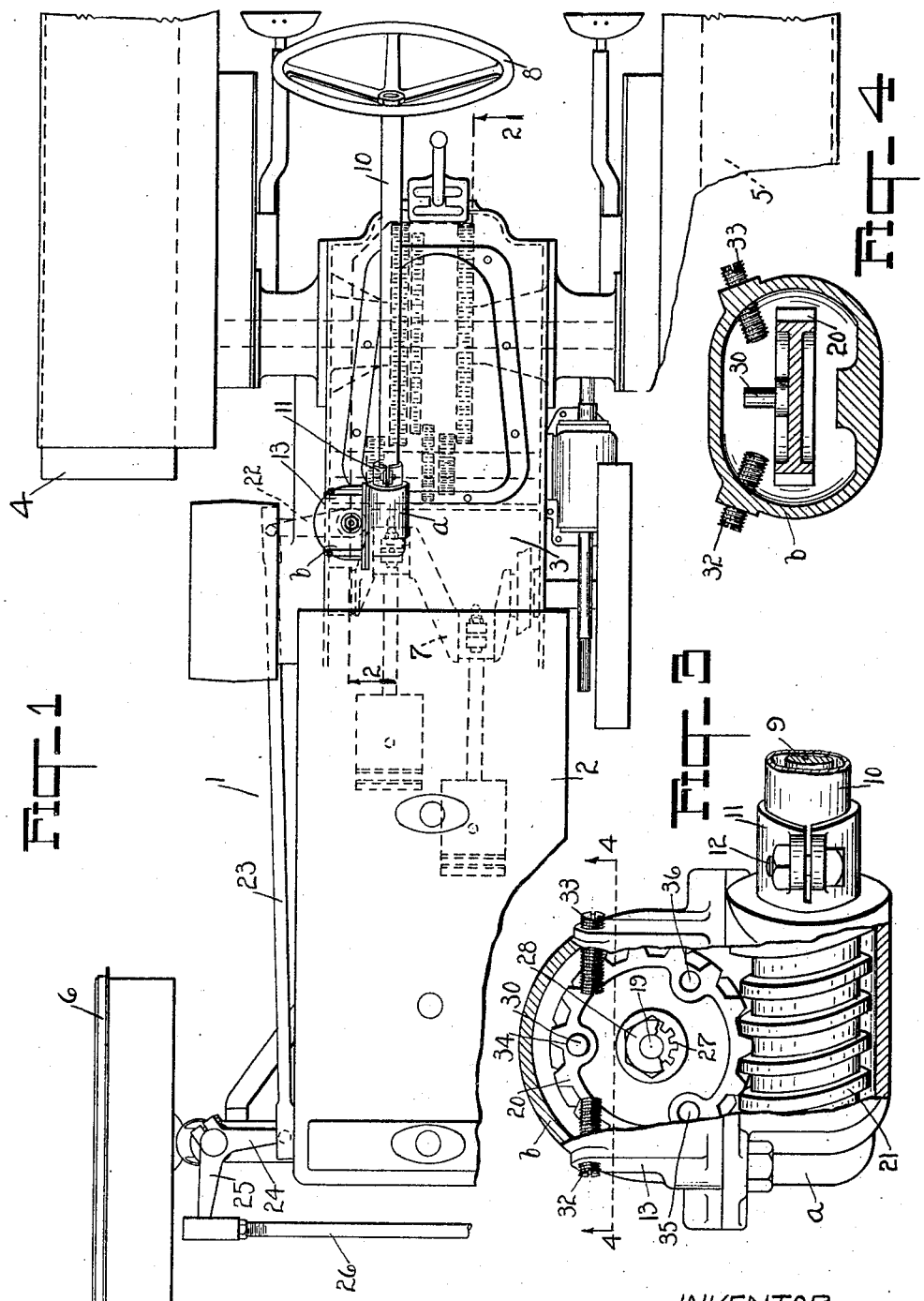
WITNESS
A. D. McLeay
INVENTOR
HAROLD·E·McCRAY
BY W C Jurinston
ATTY.

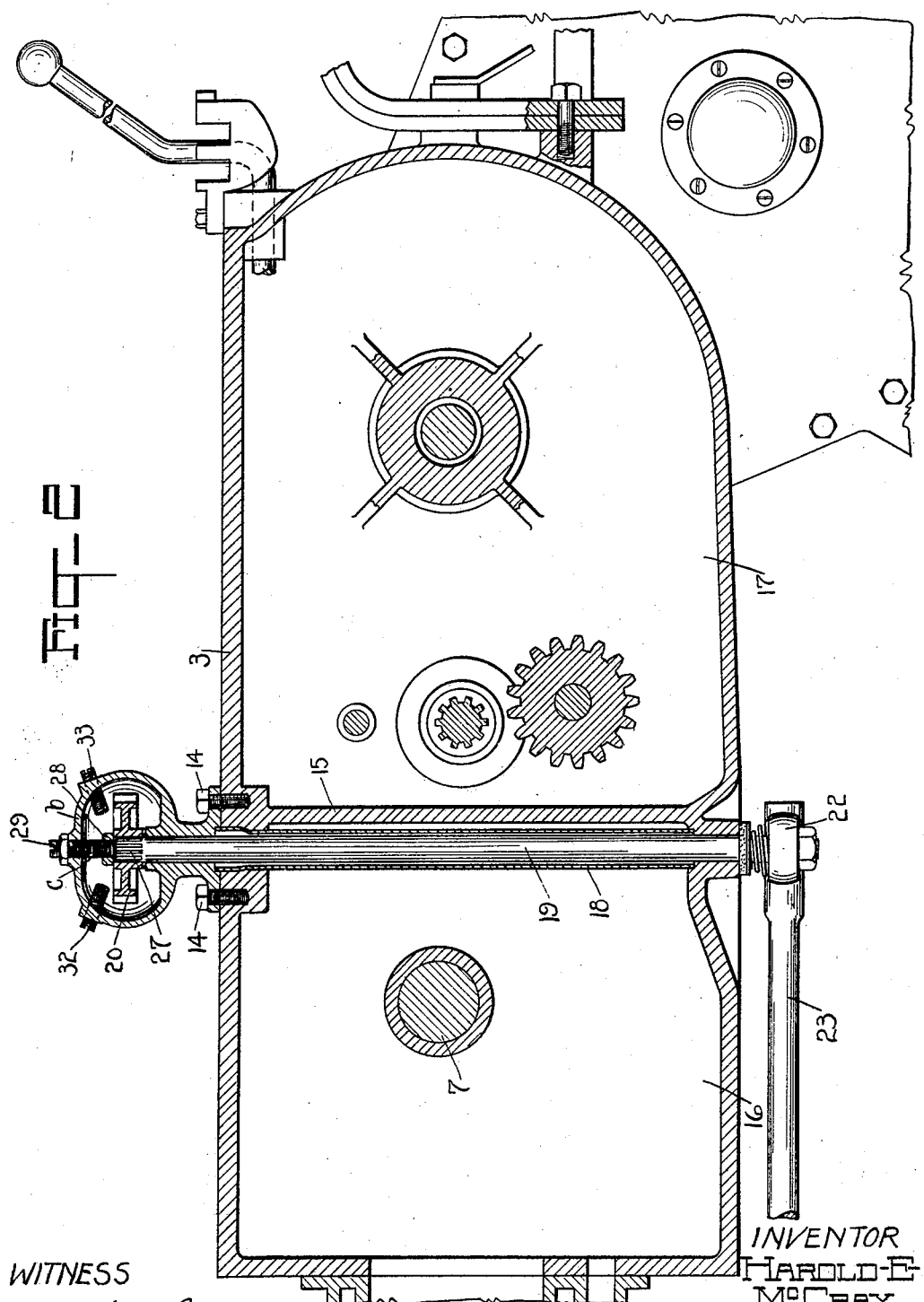

Patented Aug. 23, 1932

1,873,447

UNITED STATES PATENT OFFICE

HAROLD E. McCRAY, OF WATERLOO, IOWA, ASSIGNOR TO JOHN DEERE TRACTOR COMPANY, OF WATERLOO, IOWA, A CORPORATION OF IOWA

STEERING MECHANISM FOR TRACTORS

Application filed September 28, 1929. Serial No. 395,856.

My invention relates to tractors and particularly to improvement of the steering mechanism therefor and has for its object to increase the strength of the members and to provide certain features of adjustment to compensate for wear in the more active parts as fully described in the following specification.

Referring to the drawings in which similar numerals indicate identical parts:—

Figure 1 is a plan view showing sufficient of a tractor to illustrate the application of my invention;

Figure 2 is a detail section on the line 2—2 of Figure 1;

Figure 3 is an enlarged detail of the steering gearing and connected parts; and

Figure 4 is a section on the line 4—4 of Figure 3.

Sufficient of a tractor 1, of a well known type, has been shown in the drawings, to illustrate my invention, and includes the housings 2 and 3 in which the power mechanism of the vehicle is enclosed. As an entirety the vehicle is supported on traction wheels 4 and 5, shown in part only, and forwardly on steerable wheels one only, 6, being illustrated and demonstrating the application of certain parts of the steering mechanism as will be hereinafter explained. Power to actuate the vehicle is derived from an engine, covered in the housing 2 and 3, shown only in part in dotted lines, the engine including a crank shaft 7, dotted in Figure 1, operating suitable gearing to rotate the wheels 4 and 5.

The steering mechanism includes a steering wheel 8 mounted on a shaft 9 housed in a tubular member 10 the lower end of which is rigidly held in a collar 11. The collar 11 is split for part of its length so that by operation of a bolt 12 the tubular member 10 is firmly clamped in position. The housing 13 is formed of parts $a$ and $b$ bolted together and mounted on the housing 3 and securely held in place by bolts 14. The housing 3 is divided by a partition 15 into compartments 16 and 17, the former housing the crank shaft 7 and the latter other parts of the tractor mechanism. Adjacent the partition 15, and forwardly thereof, is a tube 18 the upper end of which is spread into a through opening in an enlargement of the top of the casing, and the lower end is held in an enlargement of the bottom of the casing, the lower enlargement operating as a bearing for a perpendicular post 19.

On the upper end of the post 19, which extends into the casing part $b$ of the housing 13, is a worm gear 20 meshing with a worm 21 on the forward end of the shaft 9 and covered in the part $a$ of said housing. On the lower end of the post 19 is an arm 22 to which is pivotally connected a rod 23 extending forwardly and pivotally attached to an arm 24 of a horizontally disposed crank connected to the wheel axle, the opposite arm 25 of the crank is pivotally connected to an equalizer bar 26 pivotally fastened to a similar arm on the opposite wheel mounting (not shown) so that both front wheels are steered simultaneously as well known in the art.

The steering post 19 is perpendicular, as stated, and its upper end is lessened in diameter to form a spindle 27 upon which the worm gear 20 is secured by a multiple spline and retained against vertical movement on the spindle by a nut 28 for the reception of which the spindle is threaded. The end of the spindle projects above the nut and contacts with a threaded bolt 29, as at $c$, projecting into the housing $b$ through a threaded orifice in an enlargement of the top of the housing; the bolt 29 operating on the upper end of the post to control any upthrust of the post, the bolt being adjustable so as to regulate the force of the contact. In mounting the post 19 perpendicularly I am enabled to arrange the rod 23 in a horizontal position and so avoid any cramping or binding upon the parts, to which it is connected, when steering the tractor over an uneven surface.

It will be readily understood that by operation of the steering wheel 8 the parts intervening between the wheel and the front wheels, and as described, are actuated to steer the front wheels in a well known manner, but I find that whenever the tractor is steered either to the right or left it is desirable to provide some means to regulate the degree of angulation of the front wheels so that the latter will not contact with any part of the body structure of the vehicle to result in wear and possible damage to the vehicle if rutted or other rough surface is being traveled over. Various means have been employed to regulate the degree of angularity to which the steering wheels can be turned but in many instances said means have been of such a nature, and so located, that rapid wear has resulted and their effectiveness materially lessened if not completely destroyed. As illustrated in Figures 2, 3 and 4 I have developed a very effective device for limiting the angularity of the front wheels when the tractor is moving from a straight course and I have affiliated it with the worm gear of the steering mechanism and covered it in the housing b.

My device consists of a pin 30, a plurality of holes 34, 35 and 36 spaced apart in enlargements of the gear rim, equidistant and parallel with the axis of the gear. Threaded bolts 32 and 33 project into the housing through threaded openings in the wall thereof, and opposite each other. As shown in Figures 3 and 4 the parts illustrated are in a position they assume when the tractor is traveling straight ahead, the pin 31 being located equidistant from the bolts 32 and 33; when the hand wheel 8 is operated to steer the vehicle the limit of the turn is decided by the pin 31 contacting with either of the bolts 32 and 33 according to the direction in which the turn is made, the bolts being adjustable to increase or lessen the distance between them and consequently increase or lessen the angularity of the front wheels.

In the event that the pin 30 has become damaged for any reason and it is difficult to extract from the hole in the gear, in which it is held, it will become necessary to insert a new pin in either of the holes 35 and 36 and to accomplish this I dismount the housing a, carrying the worm 21, from the housing b so that the gear 20 will be readily accessible; after rotating the bolts 32 and 33 and the screw bolt 31 until they have receded a sufficient distance, the nut 28 is removed and the gear raised until it is free of the spline 27 and readily removable. After a pin has been inserted the gear is turned until the new pin is in position, as shown, equidistant from the bolts 32 and 33. Re-engagement of the gear with the spline 27 and replacement of the nut 28 again holds the gear securely on the post. The bolt 29 is lowered into contact with the post and the bolts 32 and 33 again adjusted to limit the turn of the gear 20 and consequently control the angularity of the front wheels when steered. By again bolting the housing a to the housing b the worm 21 and gear 20 are again in mesh ready for use.

In the operation just described it is evident that different teeth, on the worm gear 20 will be brought into mesh with the worm 21, providing new surfaces of contact between the worm and gear to compensate for wear of the gear and worm from previous use.

By utilizing a perpendicular post I am enabled to cover it within the crank shaft housing without interference with the crank shaft, and at the same time support it in bearings at top and bottom of the housing and fully protect it from grit and dust usually apt to be accumulated in operation of the tractor, and this protection I assure by covering the post with a tubular member, within which the post rotates, and at the same time leakage of oil from the crank shaft housing at the lower bearing of the post is prevented by the perfect joint of the tubular member with the bottom of the crank case.

What I claim is—

1. In a tractor having a crank shaft and a housing therefor, the combination therewith of a perpendicular tubular member within said housing and secured to the top and bottom of the housing, the connections therewith being oil tight, a rotatable post journaled in a bearing in the bottom of the housing and covered within said member, means connecting the lower end of said post with the front wheels of the tractor and actuable to steer said wheels by rotary movement of the post, a gear housing detachably secured on the crank shaft housing having a bearing in which the upper end of said post is journaled, a worm gear on the post within the housing, a worm meshing with said gear and manually operable means to actuate said worm and gear to impart rotary motion to said post.

2. In a tractor having a crank shaft and a housing therefor, the combination therewith of a steering mechanism including a perpendicular rotatable post supported within the housing and extending through the top and bottom thereof, a bearing in the bottom of said housing in which the lower end of said post is journaled, means connecting the lower end of the post with the front wheels of the tractor and actuable to steer said wheels by rotary movement of the post, a gear housing covering the upper end of the post and detachably fixed to said crank shaft housing, a second bearing in said gear housing in which the upper end of said post is journaled, a worm gear on the end of the post within the housing above said second bearing, a shaft journaled in the housing over the worm gear, a worm on said shaft meshing with said gear, and a wheel on the shaft manually operable to turn the shaft and worm and gear and impart rotary movement to the post to steer said wheels.

3. In a tractor having a crank shaft and a housing therefor, the combination therewith of a steering mechanism including a perpendicular rotatable post supported within the housing, means connecting said post with the front wheels of the tractor and actuable to steer the wheels by rotary movement of the post, a gear housing covering the upper end of the post, a worm gear on the post within the gear housing, a shaft journaled in the latter housing, a worm on said shaft meshing with said gear, a manually controlled device on said shaft operable to turn the shaft and actuate the worm and gear to impart rotary motion to the post to steer the wheels, means on the worm gear coacting with means on its housing to limit the rotation of said post in either direction, a threaded boring in said gear housing in alinement with said post, and a screw threaded in said boring and adapted to contact with the end of said post to take the end thrust thereof.

HAROLD E. McCRAY.